United States Patent Office 3,445,530
Patented May 20, 1969

3,445,530
NITROSO COMPOUNDS AND PROCESSES FOR THEIR PRODUCTION
Nylen L. Allphin, Jr., Pinole, Calif., assignor to Marathon Oil Company, Findlay, Ohio, a corporation of Ohio
No Drawing. Filed May 14, 1965, Ser. No. 455,952
Int. Cl. C07c *81/00, 79/00;* C08g *33/00*
U.S. Cl. 260—645                     7 Claims

ABSTRACT OF THE DISCLOSURE

The invention comprises a process for the production of nitrosyl derivatives of aromatic polycarboxylic acids comprising in combination the steps of reacting polycarboxylic acids with silver nitrate to form the corresponding silver salts of said acids, treating said silver salts with nitrosyl halide and heating the reaction product thus formed to from about 100 to about 400° C. and recovering the nitrosyl derivatives of polycarboxylic aromatic acids thus formed. Among the compounds formed in the above process are nitro-nitroso napthalene.

---

The present invention relates to new aromatic compounds and in particular relates to nitrosyl derivatives of polycarboxylic acids and processes for their manufacture, and new polymeric materials derived therefrom.

The compounds of the present invention comprise aromatic rings substituted with —NO groups and particularly preferred compounds comprise such aromatic rings substituted with two —NO groups and compounds in which a number of aromatic rings are joined by

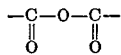

bridging groups to form new polymeric materials.

Among the compounds that may be produced by the processes of the present invention are:

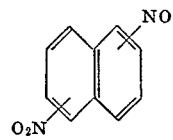

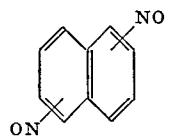

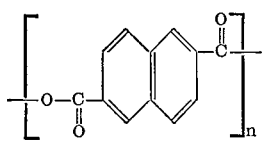

The compounds produced by the processes of the present invention are valuable as chemical intermediates for the production of a wide variety of other useful organic compounds. The preferred polymers of the present invention are essentially thermoplastic and may be utilized for production of molded shapes, etc.

It has now been found that, according to the processes of the present invention, such compounds may be produced from aromatic polycarboxylic acids by a two-step reaction. The first step comprises the treatment of the polycarboxylic acids with silver nitrate to form the corresponding silver salts. This reaction is preferably conducted at from 5 to about 90° C. and most preferably from 15 to 40° C. in a reaction media inert to the reactants and in which the reactants are substantially soluble. Preferably about 1 to 10 and most preferably 1.5 to 3 moles of silver nitrate are utilized per mole of carboxylic group in the aromatic acid. Pressure is not critical and may vary from 0.1 to 100,000 and preferably is approximately atmospheric.

In the second step of the process of the present invention, the silver salts of the aromatic polycarboxylic acids are treated with nitrosyl halide, preferably chloride preferably at a temperature of from —90 to 0 and most preferably from —80 to —50° C. As with the first step, pressure is not critical and will generally be within the ranges described above. Preferably from 0.1 to 10 and most preferably from 1.5 to 3 moles of nitrosyl halide are utilized per mole of silver in the silver salts.

Depending on the reactants and the conditions employed, the product mixture from the second step will generally contain each of the types of compounds described above, that is, those substituted with two or more —NO groups, those substituted with at least one —NO group and at least one —NO₂ group, and those polymeric materials which are linked by

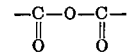

bridges.

The polycarboxylic acids useful as starting materials in the present reaction include, among others: benzene derivatives such as phthalic acid, isophthalic acid, terephthalic acid, trimesic acid, mellophanic acid, prehenitic acid, and mellitic acid; naphthalene derivatives such as naphthalic acid, various naphthalene polycarboxylic acids, and similar organic acids which may contain groups substituted on the ring which are not of such nature as to interfere with the present reaction. Because of their availability and ease of reaction, naphthalene dicarboxylic acids, especially 2,6-naphthalene dicarboxylic acid, are most preferred. In most instances, mixtures of starting materials will be employed, and recovery of the individual products may be effected by conventional methods such as fractional crystallization.

The following example will illustrate the invention but should not be taken as limiting the scope of the claims appended hereto. These claims are intended to embrace the invention including all of the apparent modifications and variations thereof.

EXAMPLE I

Formation of the di-silver salt of 2,6-naphthalene dicarboxylic acid 10.1 g. of naphthalene 2,6-dicarboxylic acid are dissolved in a 5% sodium hydroxide solution. After all the acid is dissolved, dilute nitric acid is added carefully with stirring until the pH is approximately 7. A solution of aqueous silver nitrate is added dropwise and a white solid precipitates immediately. An excess of silver nitrate is added and the solution is heated with stirring for several hours at reflux. The solid is filtered off and washed with H₂O several times. The solid is left standing in the lab for several days in a covered beaker. Then the solid is transferred to a flask and dried over P₂O₅ for 4 days, yielding about 19 g. of the di-silver salt of 2,6-naphthalic acid.

EXAMPLE II

Preparation of 2,6-dinitrosonaphthalene

A 3-neck 500 ml. flask is charged with 10 g. of the disilver salt of 2,6-naphthalene dicarboxylic acid prepared above. The flask is flushed with nitrogen and cooled to a —60° C. Nitrosyl chloride is added slowly and condensed in the flask over the silver salt. The nitrosyl chloride is allowed to remain on the silver salt for 6 hours at which time the excess nitrosyl chloride is allowed to escape by warming the flask to room temperature by removal of the flask from the Dry Ice-acetone bath.

After all of the nitrosyl chloride has apparently gone, there is still a slight evolution of gas. The residue in the flask is light yellow in color. A vacuum is pulled on the flask (20 mm.) for 2 hours to insure complete removal of nitrosyl chloride and the system is flushed with nitrogen. The flask continues to show evolution of gas. A solution of limewater is placed in a trap prior to a liquid $N_2$ trap on the effluent from the flask and the gas dissolved in the limewater forming a white precipitate, therefore showing the presence of carbon dioxide.

The reaction flask is slowly heated to approximately 100° C. and held for 3 hours during which $N_2O_3$ collects in the liquid $N_2$ trap. The temperature is then slowly raised to 200° C. A small amount of solid forms slowly in the tubes before the liquid nitrogen trap. The solid weighing 3.9 g. is removed from the trap and lines and kept under nitrogen. Tests show the solid to be a mixture of 2,6-nitroso naphthalene, 2-nitro-6-nitroso naphthalene, and a polymeric anhydride having the structure:

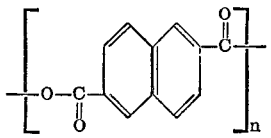

The white solid is placed in an alcohol solution, and a green solution forms. Evaporating off the alcohol, a white solid again remains. Some of the white solid does not dissolve and infrared analysis confirms that it is a polymeric anhydride.

EXAMPLE III

When terephthalic acid is similarly reacted with silver nitrate and nitrosyl chloride, the resulting product is di-nitroso benzene with some 1-nitroso-4-nitro benzene and some polymer consisting of benzene rings bridged by

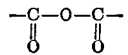

linkages.

What is claimed is:
1. A process for the production of nitrosyl derivatives of aromatic polycarboxylic acids comprising in combination the steps of reacting polycarboxylic acids with silver nitrate to form the corresponding silver salts of said acids, treating said silver salts with nitrosyl halide and heating the reaction product thus formed to from about 100 to about 400° C. and recovering the nitrosyl derivatives of polycarboxylic aromatic acids thus formed.

2. The process of claim 1 wherein the treatment with nitrosyl chloride is accomplished at a temperature of from −30 to about −120° C.

3. The process of claim 1 wherein the polycarboxylic aromatic acid starting material is a naphthalene polycarboxylic acid.

4. The process of claim 2 wherein the polycarboxylic aromatic acid starting material is a dicarboxylic aromatic acid.

5. The process of claim 2 wherein the polycarboxylic aromatic acid is 2,6-naphthalene dicarboxylic acid.

6. Nitro-nitroso naphthalene.

7. 2-nitro-6-nitroso naphthalene.

References Cited

UNITED STATES PATENTS 2,518,576  8/1960  Storgis et al. _____ 260—647 X
3,328,155  6/1967  Walworth _____ 260—645 X

OTHER REFERENCES

Mijs et al., Chem. Abs., vol. 53, p. 6118 (1959) Elsevier's Encyclopedia of Organic Chemistry, Series III, vol. 12B, Elsevier Pub. Co., New York, 1952, pp. 2792 and 2797.

Banks et al., Proc. Chem. Soc. (London), 1961, pp. 64–65.

Encyclopedia of Chemical Technology, Kirk, Othmer, Eds. vol. 9, Interscience Encyclopedia Inc., New York, 1952, pp. 386 and 387.

Chemistry of Carbon Compounds, Rodd, Ed., vol. III, Part A, Aromatic Compounds, Elsevier Publishing Company, 1954, pp. 148–152.

Elsevier Encyclopedia of Organic Chemistry, vol. 12B, p. 413 (1949), Series III.

LELAND A. SEBASTIAN, *Primary Examiner.*

U.S. Cl. X.R.
260—78.4